United States Patent [19]

Bastiansen

[11] 3,932,937

[45] Jan. 20, 1976

[54] TOOL FOR CUTTING AND GRADUATING OF PLASTIC TUBES

[76] Inventor: Gunnar Bastiansen, Rosendalsvn. 45, Oslo, Norway

[22] Filed: Mar. 21, 1975

[21] Appl. No.: 560,739

[30] Foreign Application Priority Data
Mar. 26, 1974 Norway.............................. 1077/74

[52] U.S. Cl. ................................................ 30/102
[51] Int. Cl.² ................... B23D 21/08; B23D 21/10; B26D 3/16
[58] Field of Search......................... 30/101, 102, 95

[56] References Cited
UNITED STATES PATENTS

| | | | |
|---|---|---|---|
| 554,028 | 2/1896 | Marso ...................................... | 30/95 |
| 603,662 | 5/1898 | Snedeker.............................. | 30/102 |
| 1,012,304 | 12/1911 | Vinton.................................. | 30/102 |
| 1,484,023 | 2/1924 | Hayter.................................. | 30/102 |
| 1,897,374 | 2/1933 | Goebel.................................. | 30/102 |

FOREIGN PATENTS OR APPLICATIONS

| 2,709 | 7/1880 | United Kingdom................... | 30/102 |
|---|---|---|---|

Primary Examiner—Al Lawrence Smith
Assistant Examiner—J. T. Zatarga
Attorney, Agent, or Firm—Burns, Doane, Swecker & Mathis

[57] ABSTRACT

A tool for cutting and graduating of plastic tubes. An auxiliary cutting and graduating means is adjustable mounted on the tool, thereby enabling an adjustment of the cutting angle of the said means for optimum cutting and graduating effect.

4 Claims, 4 Drawing Figures

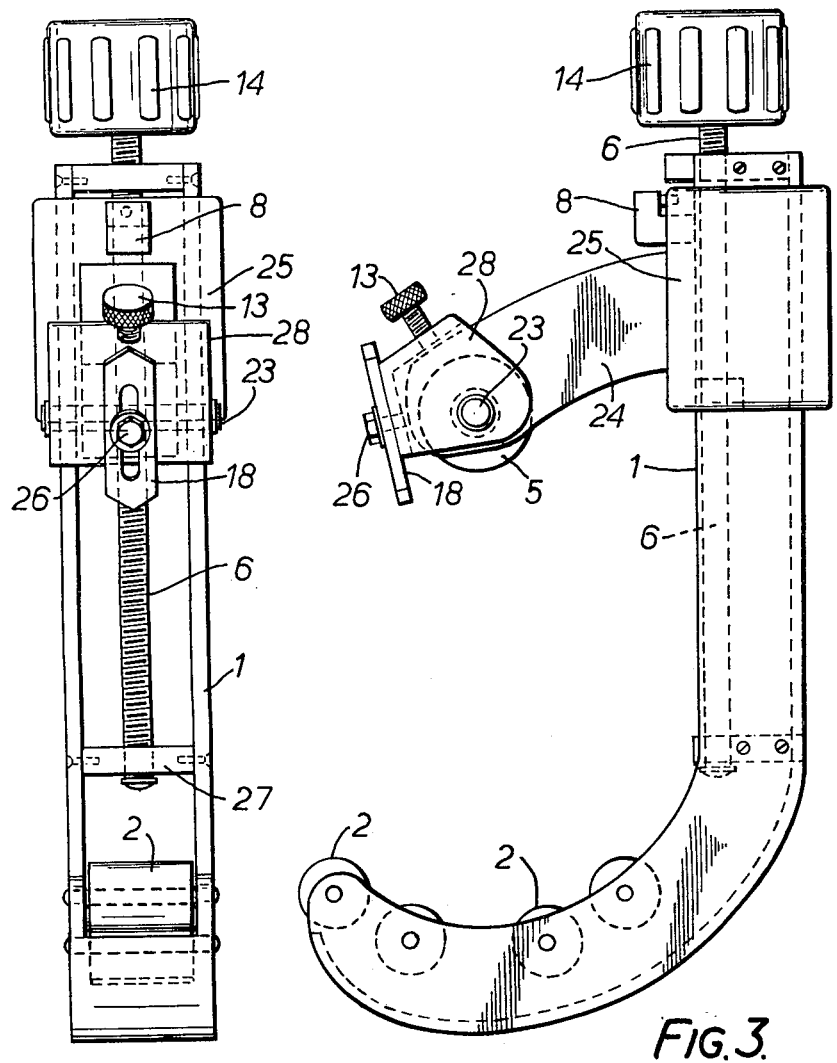
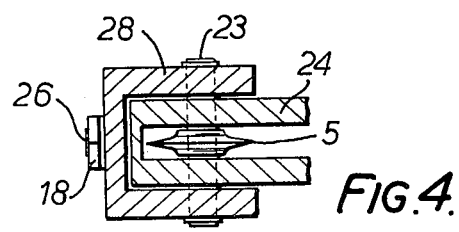
FIG. 2.   FIG. 3.   FIG. 4.

TOOL FOR CUTTING AND GRADUATING OF PLASTIC TUBES

The present invention relates to an improvement in a tool and particularly a handtool for cutting and graduating of plastic tubes. Plastic tubes are widely used as water pipes, sewage pipes, etc. It is frequently necessary to cut and adapt such tubes at the place of work and various means can then be used. Such as a saw or known types of tube cutters may be used. These cutters usually consist of a substantially C-shaped steel support member, provided with bearing or guide rollers and cutting discs. This is a well known tool for cutting iron and copper pipes also. In the tool known hitherto, the tube is cut such that the ends of the tubes are completely straight. This is a disadvantage, however, when, for example, a plastic tube is to be introduced into a connecting sleeve. The ends of the tube must then be graduated so that it can be introduced. This operation is generally carried out by hand by means of a coarse file, a knife or the like. This is hard work and is time consuming, and the actual graduation is poor so that mounting of the tubes is delayed and made difficult.

It is known a cutting tool which both cuts and graduates the tube in one and the same work operation in that, in addition to the cutting disc, an auxiliary cutting means is provided adjustably secured to the guide bracket of the cutting disc, said auxiliary cutting means accompanying the disc through the tube during the cutting and graduates the tube so that it has a correctly shaped, inclined introduction surface.

When cutting tubes of various dimensions having different diameters, it is a disadvantage of the known means that the auxiliary cutting and graduating tool frequently takes up an incorrect cutting angle with respect to the tube to be cut.

In the present invention, therefore, it is the object to provide improvements in the said tool where the auxiliary cutting and graduating means is adjustably disposed on a pivotable bracket, arranged in connection with the guide bracket of the cutting disc.

On the accompanying drawings, an embodiment example of the invention is illustrated in diagram.

FIGS. 2, 3 and 4 are details of the tool in FIG. 1.

Figure 1:
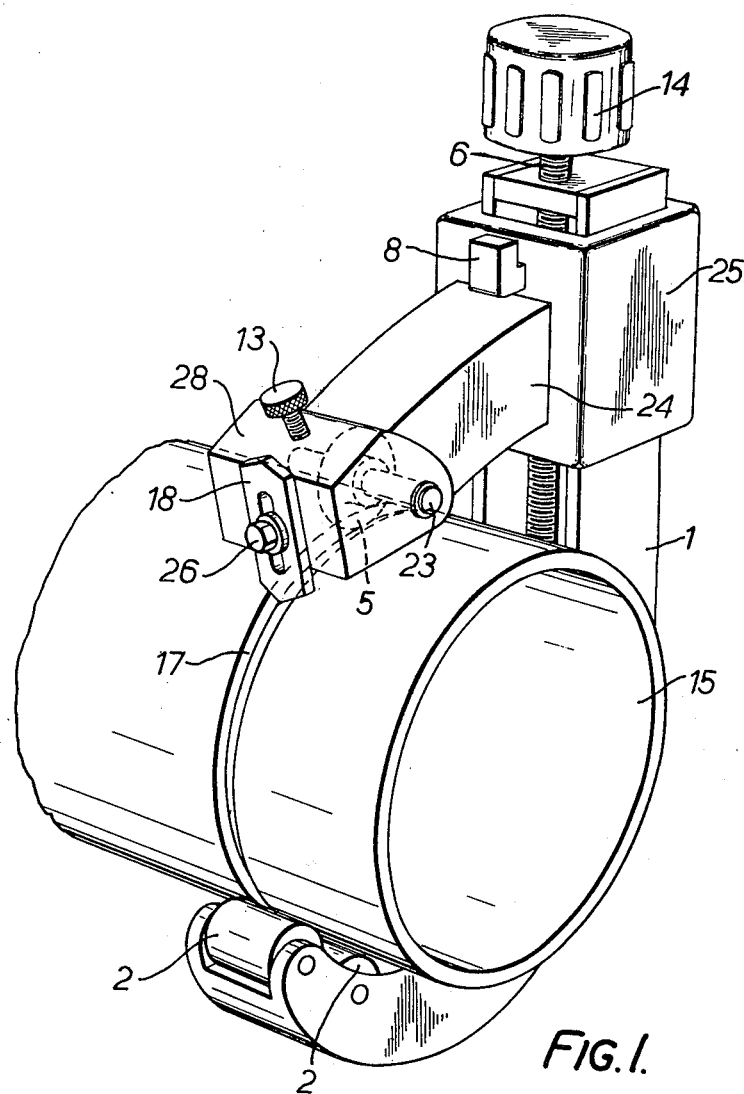
FIG. 1 is a view of a cutting tool in perspective.

As will appear from the drawings, the steel support member 1 is provided in usual manner with bearing or guide rollers 2, and a feed screw 6. The tool is, in known manner, provided with a cutting means in the form of a cutting disc 5. In addition to the primary cutting means 5, the tool is provided with a substantially V-shaped blade 18, representing an auxiliary cutting and graduating means.

The auxiliary cutting and graduating means 18 is adjustably mounted to a pivotable bracket 28. The elongate auxiliary cutting and graduating means 18 is adapted to be locked in longitudinal position by means of an adjusting screw 26. The pivotable bracket 28 is connected in articulated manner 23 to the guide bracket 24 of the cutting disc 5. This is, in turn, via a guide block 25, disposed in direct connection with the feed screw 6 of the support member 1, and, in known manner, may be released for rapid displacement by means of a blocking arm 8. The guide bracket 24 extends approximately straight out from the straight stem of the support member 1. The actual support member 1 has a substantially J-shaped profile. This is in order to allow positioning, movement and forming of the guide bracket 24, so that the pivotable bracket 28 has the necessary and correct radius of movement. The pivotable bracket 28 is also adjustable by means of an adjusting screw 13. The feed screw is, in known manner, provided with a button 14 for operation. The lowest part of the support member 1 is, in known manner, provided with friction-preventing rollers 2. The feed screw 6 is stationary mounted in the straight stem of the support member 1 by means of a blocking disc 27. When a plastic tube 15 is cut, it is provided with the correct graduated surface 17, regardless of the diameter of the cut tube. In that the mounting bracket 28 of the auxiliary cutting and graduating means 18 is pivotable and adjustably mounted to the guide bracket 24, the cutting angle of the cutting and graduating means 18 with respect to the tube to be cut can at all times be adjusted for optimum cutting and graduating effect.

Having thus described my invention, I claim:

1. A tool for cutting and graduating plastic tubes, comprising:
   a support member including an arcuate section;
   a guide bracket supported by and projecting from said support member at a location spaced from said arcuate section;
   primary cutting means, carried by said guide bracket, for cutting a tube disposed between said arcuate section of said support member and said guide bracket projecting from said support member;
   a pivotable support bracket adjustably articulated to said guide bracket; and
   auxiliary cutting and graduating means mounted on said support bracket in position to graduate the tube being cut by said primary cutting means.

2. The apparatus according to claim 1 wherein:
   said support member has a substantially J-shaped profile defined by said arcuate section and a generally straight stem projecting therefrom;
   a feed screw is disposed in said stem; and
   said guide bracket projects substantially straight out from said stem and is directly connected with said feed screw.

3. The apparatus according to claim 1 wherein:
   said auxiliary cutting and graduating means is substantially V-shaped.

4. The apparatus according to claim 1 wherein said auxiliary cutting and graduating means is elongated and including:
   means for longitudinally adjusting said elongate auxiliary cutting and graduating means on said support bracket.

* * * * *